United States Patent
Jung et al.

(10) Patent No.: US 12,284,385 B2
(45) Date of Patent: Apr. 22, 2025

(54) METHOD AND DEVICE FOR PROCESSING MULTI-VIEW VIDEO DATA WITH SYNTHESIS DATA

(71) Applicant: ORANGE, Issy les Moulineaux (FR)

(72) Inventors: Joël Jung, Chatillon (FR); Pavel Nikitin, Chatillon (FR); Patrick Garus, Chatillon (FR)

(73) Assignee: ORANGE, Issy les Moulineaux (FR)

( * ) Notice: Subject to any disclaimer, the term of this patent is extended or adjusted under 35 U.S.C. 154(b) by 117 days.

(21) Appl. No.: 17/799,101

(22) PCT Filed: Feb. 4, 2021

(86) PCT No.: PCT/FR2021/050207
§ 371 (c)(1),
(2) Date: Aug. 11, 2022

(87) PCT Pub. No.: WO2021/160955
PCT Pub. Date: Aug. 19, 2021

(65) Prior Publication Data
US 2023/0065861 A1    Mar. 2, 2023

(30) Foreign Application Priority Data
Feb. 14, 2020  (FR) ...................................... 2001464

(51) Int. Cl.
| | |
|---|---|
| *H04N 19/597* | (2014.01) |
| *H04N 13/161* | (2018.01) |
| *G06T 9/00* | (2006.01) |
| *H04N 19/39* | (2014.01) |

(52) U.S. Cl.
CPC ......... *H04N 19/597* (2014.11); *H04N 13/161* (2018.05); *G06T 9/001* (2013.01); *H04N 19/39* (2014.11)

(58) Field of Classification Search
CPC ........................... H04N 19/597; H04N 13/161
See application file for complete search history.

(56) References Cited

U.S. PATENT DOCUMENTS

| | | |
|---|---|---|
| 9,736,454 B2 | 8/2017 | Hannuksela et al. |
| 2014/0168362 A1* | 6/2014 | Hannuksela ......... H04N 13/161 |
| | | 348/43 |

(Continued)

FOREIGN PATENT DOCUMENTS

| | | |
|---|---|---|
| EP | 2898689 A1 | 7/2015 |
| WO | 2013159330 A1 | 10/2013 |
| WO | 2014044908 A1 | 3/2014 |

OTHER PUBLICATIONS

English translation of the Written Opinion of the International Searching Authority dated Mar. 18, 2021 for corresponding International Application No. PCT/FR2021/050207, filed Feb. 4, 2021.

(Continued)

*Primary Examiner* — Richard T Torrente
(74) *Attorney, Agent, or Firm* — David D. Brush; Westman, Champlin & Koehler, P.A.

(57) ABSTRACT

A method for processing multi-view video data including, for at least one block of an image of a view encoded in an encoded data stream representing the multi-view video, obtaining at least one information item, which specifies a mode for obtaining a synthesis data item, from among first and second obtaining modes. The synthesis data item is used to synthesize at least one image of an intermediate view of the multi-view video, the intermediate view not being encoded in the encoded data stream. The first obtaining mode involves decoding an information item representing the synthesis data item from the encoded data stream, the second obtaining mode involves obtaining the synthesis data item from at least the reconstructed encoded image. At least one part of an image of the intermediate view is synthesised from at least the reconstructed encoded image and the synthesis data item obtained by the specified mode.

17 Claims, 6 Drawing Sheets

(56) References Cited

U.S. PATENT DOCUMENTS

| | | | | |
|---|---|---|---|---|
| 2014/0314147 | A1* | 10/2014 | Rusanovskyy | H04N 19/503 375/240.12 |
| 2015/0245063 | A1* | 8/2015 | Rusanovskyy | H04N 19/597 375/240.12 |
| 2017/0164003 | A1* | 6/2017 | Lee | H04N 5/2226 |

OTHER PUBLICATIONS

International Search Report dated Mar. 5, 2021 for corresponding International Application No. PCT/FR2021/050207 filed Feb. 4, 2021.

Written Opinion of the International Searching Authority dated Mar. 5, 2021 for corresponding International Application No. PCT/FR2021/050207, filed Feb. 4, 2021.

French Search Report and Written Opinion dated Sep. 4, 2020 for corresponding French Application No. 2001464, filed Feb. 14, 2020.

"Workshop on Coding Technologies for Immersive Audio/Visual Experiences", No. n18559, Jul. 28, 2019 (Jul. 28, 2019), 127. MPEG Meeting; Jul. 8, 2019-Jul. 12, 2019; Gothenburg; (Motion Picture Expert Group or ISO/IEC JTC1/SC29/WG11), Retrieved from the Internet: URL:http://phenix.int-evry.fr/mpeg/doc_end_user/documents/127_Gothenburg/wg11/w18559.zip 6. Workshop MPEG-Jul. 2019—JJung.pdf , XP030221843.

Garus P et al., "[MPEG-I Visual] A 37% MV-HEVC+VVS anchor improvement with 50% pixel rate reduction", No. m49153, Jul. 3, 2019 (Jul. 3, 2019), 127. MPEG Meeting; Jul. 8, 2019-Jul. 12, 2019; Gothenburg; (Motion Picture Expert Group or ISO/IEC JTC1/SC29/WG11), Retrieved from the Internet: URL:http://phenix.int-evry.fr/mpeg/doc_end_user/documents/127_Gothenburg/wg11/m49153-v1-m49153.zip m49153.docx , XP030207362.

* cited by examiner

METHOD AND DEVICE FOR PROCESSING MULTI-VIEW VIDEO DATA WITH SYNTHESIS DATA

CROSS-REFERENCE TO RELATED APPLICATIONS

This Application is a Section 371 National Stage Application of International Application No. PCT/FR2021/050207, filed Feb. 4, 2021, which is incorporated by reference in its entirety and published as WO 2021/160955 A1 on Aug. 19, 2021, not in English.

FIELD OF THE INVENTION

The invention relates to immersive videos, representative of a scene captured by one or more cameras, including the videos for virtual reality and free navigation. More particularly, the invention relates to the processing (encoding, decoding, synthesis of intermediate views) of data from such videos.

PRIOR ART

An immersive video allows a viewer to watch a scene from any viewpoint, even from a viewpoint that has not been captured by a camera. A typical acquisition system is a set of cameras that captures a scene with several cameras located outside the scene or with divergent cameras built on a spherical platform. The videos are usually displayed via virtual reality headsets (also known as head-mounted devices, or HMDs), but can also be displayed on 2D screens with an additional system to interact with the user.

Free navigation in a scene requires that every movement of the user is properly managed in order to avoid motion sickness. The movement is usually correctly captured by the display device (an HMD headset, for example). However, providing the correct pixels for display, regardless of the movement of the user (rotational or translational), is currently problematic. This requires multiple captured views and the ability to generate additional virtual (synthesised) views, calculated from the decoded captured views and the associated depths. The number of views to be transmitted varies depending on the use cases. However, the number of views to be transmitted and the amount of associated data are often high. Consequently, the transmission of the views is an essential aspect of immersive video applications. It is therefore necessary to reduce the bit rate of the information to be transmitted as much as possible without compromising the quality of the synthesis of the intermediate views.

In a typical immersive video processing scheme, the views are physically captured or generated by computer. In some cases, the depths are also captured with dedicated sensors. However, the quality of this depth information is generally poor and prevents an effective synthesis of the intermediate viewpoints.

Depth maps can also be calculated from the texture images of the captured videos. Many depth estimation algorithms exist and are used in the state of the art.

The texture images and the estimated depth information are encoded and sent to a user's display device, as illustrated in FIG. 1. FIG. 1 shows an immersive video processing scheme comprising for example two captured views having respectively the texture information $T_{x0y0}$ and $T_{x1y0}$. Depth information $D_{x0y0}$ and $D_{x1y0}$ associated with each view $T_{x0y0}$ and $T_{x1y0}$ is estimated by an estimation module FE. For example, the depth information $D_{x0y0}$ and $D_{x1y0}$ is obtained by a depth estimation software (Depth Estimation Reference Software, or DERS), the views $T_{x0y0}$ and $T_{x1y0}$ and the depth information $D_{x0y0}$ and $D_{x1y0}$ obtained are then encoded (CODEC), for example using an MV-HEVC encoder. On the client side, the views $T^*_{x0y0}$ and $T^*_{x1y0}$ and the associated depths of each view $D^*_{x0y0}$ and $D^*_{x1y0}$ are decoded and used by a synthesis algorithm (SYNTHESIS) to calculate intermediate views, for example here intermediate views $S_{x0y0}$ and $S_{x1y0}$. For example, the VSRS (View Synthesis Reference Software) software can be used as a view synthesis algorithm.

When the depth maps are calculated prior to encoding and transmitting the encoded data of an immersive video, various problems are encountered. In particular, the rate associated with the transmission of the various views is high. Particularly, although depth maps are generally less expensive than texture, they remain a significant proportion of the bit stream (15% to 30% of the total).

In addition, complete depth maps are generated and sent, whereas on the client side, not all parts of all depth maps are necessarily useful. Indeed, the views can have redundant information, which makes some parts of depth maps unnecessary. In addition, in some cases, the viewers may request only specific viewpoints. Without a feedback channel between the client and the server providing the encoded immersive video, the depth estimator located on the server side is not aware of these specific viewpoints.

Calculating the depth information on the server side avoids any interaction between the depth estimator and the synthesis algorithm. For example, if a depth estimator wants to inform the synthesis algorithm that it cannot correctly find the depth of a specific area, it must transmit this information in the binary stream, most likely in the form of a binary map.

In addition, the configuration of the encoder to encode the depth maps in order to obtain the best compromise between synthesis quality and encoding cost for depth map transmission is not obvious.

Finally, the number of pixels to be processed by a decoder is high when the textures and the depth maps are encoded, transmitted and decoded. This can slow down the deployment of immersive video processing schemes on terminals such as smartphones.

There is therefore a need to improve the prior art.

SUMMARY OF THE INVENTION

The invention improves the state of the art. For this purpose, it relates to a method for processing the data of a multi-view video, comprising:
  obtaining, for at least one block of an image of a view encoded in an encoded data stream representative of the multi-view video, at least one information item specifying a mode for obtaining at least one synthesis data item, from among a first obtaining mode and a second obtaining mode,
  said at least one synthesis data item being used to synthesise at least one image of an intermediate view of the multi-view video, said intermediate view not being encoded in said encoded data stream,
  said first obtaining mode corresponding to decoding at least one information item representative of the at least one synthesis data item from the encoded data stream,
  said second obtaining mode corresponding to obtaining the at least one synthesis data item from at least said reconstructed encoded image, obtaining the at least one synthesis data item according to the obtaining mode specified by said at least one information item, synthesising at least one part of an image of said intermediate view from at least said reconstructed encoded image and said at least one synthesis data item obtained.

The invention takes advantage of various modes for obtaining synthesis data in a flexible way by allowing the selection of an optimal mode for obtaining each synthesis data item, for example in terms of encoding cost/quality of the synthesis data item or depending on the tools available on the decoder side and/or encoder side. This selection is flexible since it can be done at the block, image, view or video level. The granularity level of the mode for obtaining the synthesis data can therefore be adapted depending on the content of the multi-view video for example or the tools available on the client/decoder side.

According to a first obtaining mode, the synthesis data item is determined on the encoder side, encoded and transmitted to a decoder in a data stream. According to this first obtaining mode, the quality of the synthesis data item can be privileged since it is determined from original images, that are not encoded for example. The synthesis data item is not subject to the encoding artifacts of the decoded textures during its estimation.

According to a second obtaining mode, the synthesis data item is determined on the decoder side. According to this second obtaining mode, the data necessary to synthesise intermediate views is obtained from the decoded and reconstructed views that have been transmitted to the decoder. Such synthesis data can be obtained at the decoder, or by a decoder-independent module taking as input the views decoded and reconstructed by the decoder. This second obtaining mode reduces the encoding cost the multi-view video data and makes the decoding of the multi-view video easier, since the decoder no longer has to decode the data used for the intermediate view synthesis.

The invention also improves the quality of the intermediate view synthesis. Indeed, in some cases, a synthesis data item estimated at the decoder can be more appropriate for the synthesis of views than an encoded synthesis data item, for example when different estimators are available on the client side and server side. In other cases, determining the synthesis data item at the encoder may be more appropriate, for example when the decoded textures have compression artifacts or when the textures do not include enough redundant information to estimate the synthesis data on the client side.

According to a particular embodiment of the invention, said at least one synthesis data item corresponds to at least one part of a depth map.

According to another particular embodiment of the invention, said at least one information item specifying a mode for obtaining the synthesis data item is obtained by decoding a syntax element. According to this particular embodiment of the invention, the information item is encoded in the data stream.

According to another particular embodiment of the invention, said at least one information item specifying a mode for obtaining the synthesis data item is obtained from at least one encoded data item for the reconstructed encoded image. According to this particular embodiment of the invention, the information item is not directly encoded in the data stream, it is derived from the encoded data for an image in the data stream. The process for deriving the synthesis data item is identical here at the encoder and the decoder.

According to another particular embodiment of the invention, the obtaining mode is selected from among the first obtaining mode and the second obtaining mode depending on a value of a quantization parameter used to encode at least said block.

According to another particular embodiment of the invention, the method further comprises, when said at least one information item specifies that the synthesis data item is obtained according to the second obtaining mode:

decoding at least one control parameter from an encoded data stream, applying said control parameter when obtaining said synthesis data item according to the second obtaining mode.

This particular embodiment of the invention makes it possible to control the method for obtaining the synthesis data item, for example to control the features of a depth estimator such as the size of the search window or the precision. The control parameter can also specify which depth estimator to use, and/or the parameters of that estimator, or a depth map to initialise the estimator.

The invention also relates to a device for processing multi-view video data comprising a processor configured to:

obtain, for at least one block of an image of a view encoded in an encoded data stream representative of the multi-view video, at least one information item specifying a mode for obtaining at least one synthesis data item, from among a first obtaining mode and a second obtaining mode, said at least one synthesis data item being used to synthesise at least one image of an intermediate view of the multi-view video, said intermediate view not being encoded in said encoded data stream, said first obtaining mode corresponding to decoding at least one information item representative of the at least one synthesis data item from the encoded data stream, said second obtaining mode corresponding to obtaining the at least one synthesis data item from at least said reconstructed encoded image, obtain the at least one synthesis data item according to the obtaining mode specified by said at least one information item, synthesise at least one part of an image of said intermediate view from at least said reconstructed encoded image and said at least one synthesis data item obtained.

According to a particular embodiment of the invention, the device for processing multi-view video data is comprised in a terminal.

The invention also relates to a method for encoding multi-view video data, comprising:

determining, for at least one block of an image of a view in an encoded data stream representative of the multi-view video, at least one information item specifying a mode for obtaining at least one synthesis data item, from among a first obtaining mode and a second obtaining mode, said at least one synthesis data item being used to synthesise at least one image of an intermediate view of the multi-view video, said intermediate view not being encoded in said encoded data stream, said first obtaining mode corresponding to decoding at least one information item representative of the at least one synthesis data item from the encoded data stream, said second obtaining mode corresponding to obtaining the at least one synthesis data item from at least said reconstructed encoded image, encoding said image in the encoded data stream.

According to a particular embodiment of the invention, the encoding method comprises encoding in the data stream a syntax element associated with said information item specifying a mode for obtaining the synthesis data item.

According to a particular embodiment of the invention, the encoding method further comprises, when the information item specifies that the synthesis data item is obtained according to the second obtaining mode:

encoding in an encoded data stream at least one control parameter to be applied when obtaining said synthesis data item according to the second obtaining mode.

The invention also relates to a multi-view video data encoding device, comprising a processor and a memory configured to:

determine, for at least one block of an image of a view in an encoded data stream representative of the multi-view video, at least one information item specifying a mode for obtaining at least one synthesis data item, from among a first obtaining mode and a second obtaining mode, said at least one synthesis data item being used to synthesise at least one image of an intermediate view of the multi-view video, said intermediate view not being encoded in said encoded data stream, said first obtaining mode corresponding to decoding at least one information item representative of the at least one synthesis data item from the encoded data stream, said second obtaining mode corresponding to obtaining the at least one synthesis data item from at least said reconstructed encoded image, encode said image in the encoded data stream.

The method for processing multi-view video data according to the invention can be implemented in various ways, notably in wired form or in software form. According to a particular embodiment of the invention, the method for processing multi-view video data is implemented by a computer program. The invention also relates to a computer program comprising instructions for implementing the method for processing multi-view video data according to any one of the particular embodiments previously described, when said program is executed by a processor. Such a program can use any programming language. It can be downloaded from a communication network and/or recorded on a computer-readable medium. This program can use any programming language, and can be in the form of source code, object code, or intermediate code between source code and object code, such as in a partially compiled form, or in any other desirable form.

The invention also relates to a computer-readable storage medium or data medium comprising instructions of a computer program as mentioned above. The recording medium mentioned above can be any entity or device able to store the program. For example, the medium can comprise a storage means, such as a ROM, for example a CD-ROM or a microelectronic circuit ROM, a USB flash drive, or a magnetic recording means, for example a hard drive. On the other hand, the recording medium can correspond to a transmissible medium such as an electrical or optical signal, that can be carried via an electrical or optical cable, by radio or by other means. The program according to the invention can be downloaded in particular on an Internet-type network.

Alternatively, the recording medium can correspond to an integrated circuit in which the program is embedded, the circuit being adapted to execute or to be used in the execution of the method in question.

LIST OF FIGURES

Other characteristics and advantages of the invention will emerge more clearly upon reading the following description of a particular embodiment, provided as a simple illustrative non-restrictive example, and the annexed drawings, wherein.

DESCRIPTION OF AN EMBODIMENT OF THE INVENTION

Figure 1:
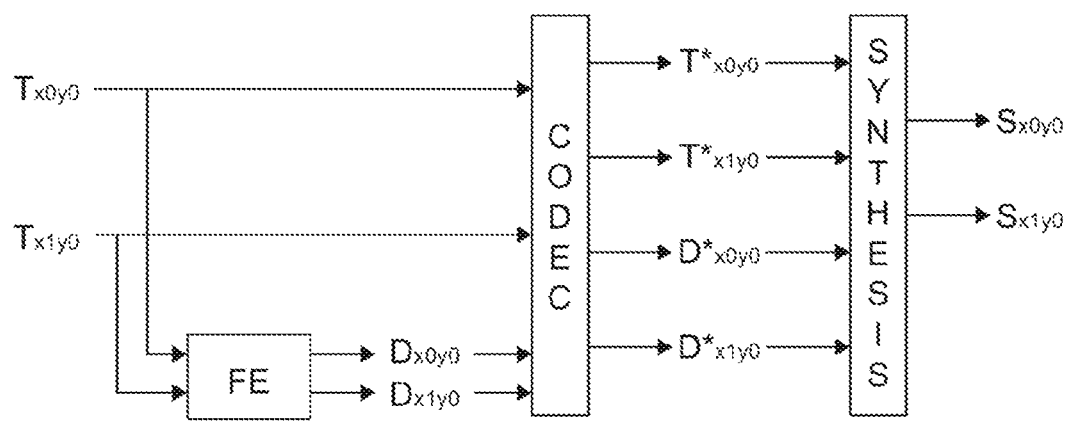
FIG. 1 illustrates a multi-view video data processing scheme according to the prior art.

FIG. 1, described above, illustrates a multi-view video data processing scheme according to the prior art. According to this embodiment, the depth information is determined, encoded and transmitted in a data stream to the decoder that decodes it.

Figure 2:
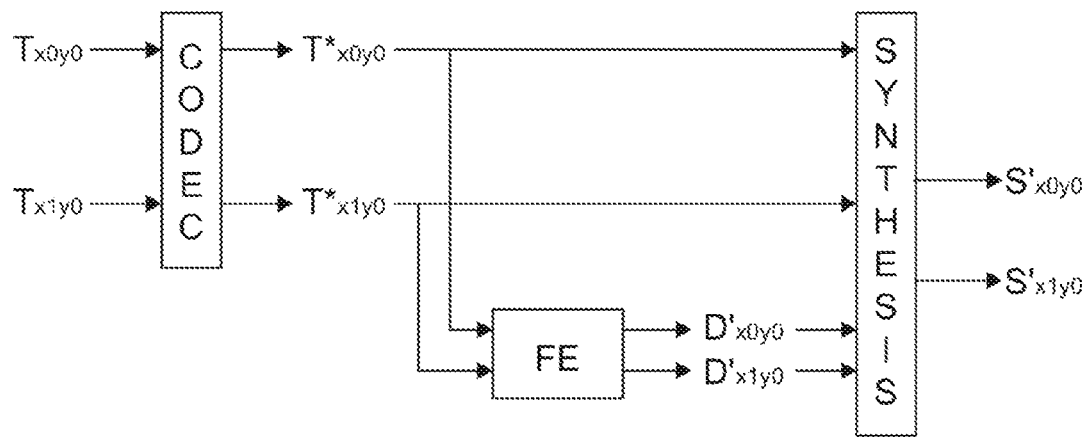
FIG. 2 illustrates a multi-view video data processing scheme according to a particular embodiment of the invention.

FIG. 2 illustrates a multi-view video data processing scheme according to a particular embodiment of the invention. According to this particular embodiment of the invention, the depth information is not encoded in the data stream, but determined on the client side, from the reconstructed images of the multi-view video.

According to the scheme illustrated in FIG. 2, the texture images $T_{x0y0}$ and $T_{x1y0}$ originating from captured views are encoded (CODEC), for example using an MV-HEVC encoder, and sent to a user's display device, for example. On the client side, the textures $T^*_{x0y0}$ and $T^*_{x1y0}$ of the views are decoded and used to estimate the depth information $D'_{x0y0}$ and $D'_{x1y0}$ associated with each view $T_{x0y0}$ and $T_{x1y0}$, by an estimation module FE. For example, the depth information $D'_{x0y0}$ and $D'_{x1y0}$ is obtained by a depth estimation software (DERS).

The decoded views $T^*_{x0y0}$ and $T^*_{x1y0}$ and the associated depths of each view $D'_{x0y0}$ and $D'_{x1y0}$ are used by a synthesis algorithm (SYNTHESIS) to calculate intermediate views, for example here intermediate views $S'_{x0,0}$ and $S'_{x1,0}$. For example, the above-mentioned VSRS software can be used as a view synthesis algorithm.

When the depth information is estimated after transmitting the encoded data of the multi-view video, the following problems may be encountered. Due to compression artifacts, for example block effects, or quantization noise, present in the textures decoded and used to estimate the depth information, especially at a low rate, incorrect depth values can be obtained.

In addition, the complexity of the client terminal is greater than when the depth information is transmitted to the decoder. This may imply using simpler depth estimation algorithms at the encoder, that may then fail in complex scenes.

On the client side, it may happen that the texture information does not include enough redundancy to perform the depth estimation or data useful for synthesis, for example due to server-side encoding of the texture information during which texture information may not be encoded.

The invention proposes a method for selecting a mode for obtaining the synthesis data from among a first obtaining mode (M1) according to which the synthesis data is encoded and transmitted to the decoder and a second obtaining mode (M2) according to which the synthesis data is estimated on the client side. This method takes advantage of both approaches in a flexible way.

For this purpose, the best path to obtain one or more synthesis data items is selected for each image, or each block or for any other granularity.

Figure 3A:
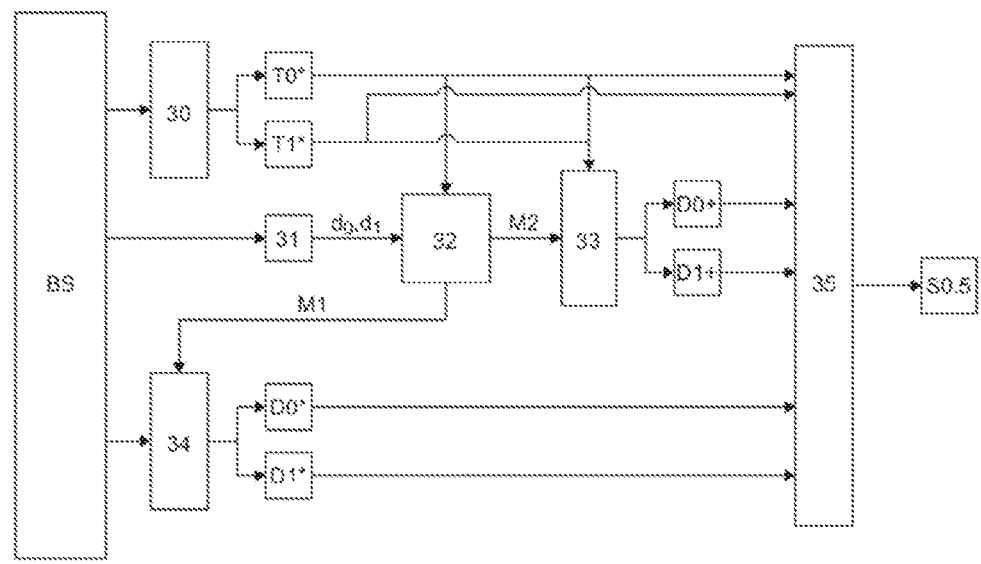
FIG. 3A illustrates steps of a method for processing multi-view video data according to a particular embodiment of the invention.

FIG. 3A illustrates steps of a method for processing multi-view video data according to a particular embodiment of the invention. According to this particular embodiment of the invention, the selected obtaining mode is encoded and transmitted to the decoder.

A data stream BS comprising in particular texture information of one or more views of a multi-view video is transmitted to the decoder. For example, it is considered that two views have been encoded in the data stream BS.

The data stream BS also comprises at least one syntax element representative of an information item specifying a mode for obtaining at least one synthesis data item, from among a first obtaining mode M1 and a second obtaining mode M2.

In a step 30, the decoder decodes the texture information of the data stream to obtain the textures $T^*_0$ and $T^*_1$.

In a step 31, the syntax element representative of the information item specifying an obtaining mode is decoded from the data stream. This syntax element is encoded in the data stream for at least one block of the texture image of a view. Its value can therefore change at each texture block of a view. According to another variant, the syntax element is encoded once for all blocks of the texture image of a view $T_0$ or $T_1$. The information item specifying a mode for obtaining a synthesis data item is thus the same for all blocks of the texture image $T_0$ or $T_1$.

In yet another variant, the syntax element is encoded once for all texture images of the same view or the syntax element is encoded once for all views.

The variant according to which the syntax element is encoded for each texture image of a view is considered here. Following step 31, an obtaining mode information item $d_0$ associated with the decoded texture image $T^*_0$ and an obtaining mode information item $d_1$ associated with the decoded texture image $T^*_1$ are then obtained.

In a step 32, it is checked for each information item $d_0$ and $d_1$ specifying a mode for obtaining the synthesis data associated respectively with the decoded texture images $T^*_0$ and $T^*_1$ whether the obtaining mode corresponds to the first obtaining mode M1 or to the second obtaining mode M2.

If the information item $d_0$, respectively $d_1$, specified the first obtaining mode M1, in a step 34, the synthesis data $D^*_0$, respectively $D^*_1$, associated with the decoded texture image $T^*_0$, respectively $T^*_1$, is decoded from the data stream BS.

If the information item $d_0$, respectively $d_1$, specifies the second obtaining mode M2, in a step 33, the synthesis data $D^*_0$, respectively $D^*_1$, associated with the decoded texture image $T^*_0$, respectively $T^*_1$, is estimated from the reconstructed texture images of the multi-view video. For this purpose, the estimation can use the decoded texture $T^*_0$, respectively $T^*_1$, and possibly other previously reconstructed texture images.

In a step 35, the decoded textures $T^*_0$ and $T^*_1$ and the decoded ($D^*_0$, $D^*_1$) or estimated ($D^*_0$, $D^*_1$) synthesis information are used to synthesise an image of an intermediate view S0.5.

Figure 3B:
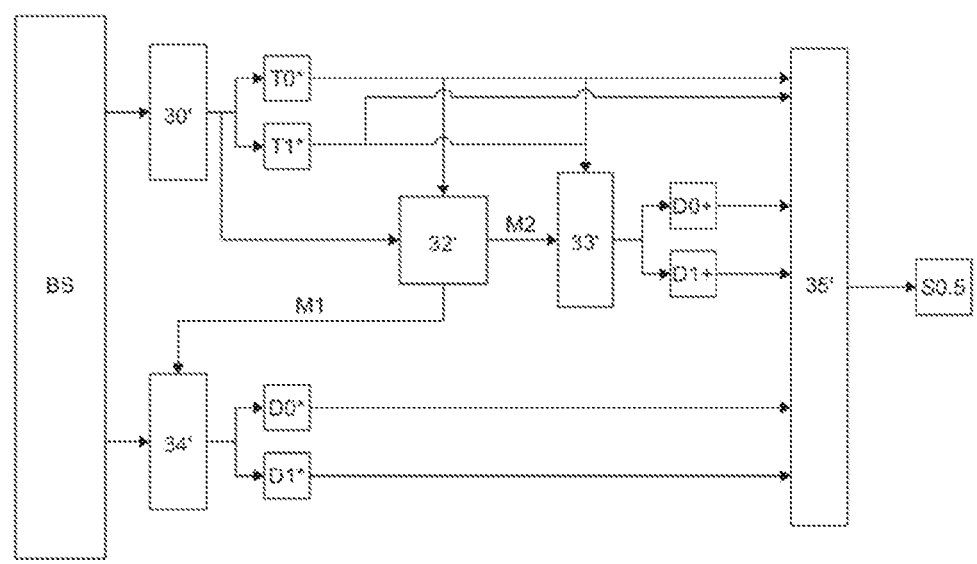
FIG. 3B illustrates steps of a method for processing multi-view video data according to another particular embodiment of the invention.

FIG. 3B illustrates steps of a method for processing multi-view video data according to another particular embodiment of the invention. According to this other particular embodiment of the invention, the selected obtaining mode is not transmitted to the decoder. It derives the obtaining mode from the previously decoded texture data.

A data stream BS comprising in particular texture information of one or more views of a multi-view video is transmitted to the decoder. For example, it is considered that two views have been encoded in the data stream BS.

In a step 30', the decoder decodes the texture information of the data stream to obtain the textures $T^*_0$ and $T^*_1$.

In a step 32', the decoder obtains an information item specifying a mode from among a first obtaining mode M1 and a second obtaining mode M2, for obtaining at least one synthesis data item to be used to synthesise an image of an intermediate view. According to a variant, this information item can be obtained for each block of the texture image of a view. The obtaining mode can thus change at each texture block of a view.

According to another embodiment, this information item is obtained once for all blocks of the texture image of a view $T^*_0$ or $T^*_1$. The information item specifying a mode for obtaining a synthesis data item is thus the same for all blocks of the texture image $T^*_0$ or $T^*_1$.

According to yet another variant, the information item is obtained once for all texture images of a same view or the information item is obtained once for all views.

The variant according to which the information item is obtained for each texture image of a view is considered here. Following step 32', an obtaining mode information item $d_0$ associated with the decoded texture image $T^*_0$ and an obtaining mode information item $d_1$ associated with the decoded texture image $T^*_1$ are then obtained. The obtaining mode information item is obtained here by applying the same determination process as that applied at the encoder. An example of a determination process is described later in relation to FIG. 4.

Following step 32', if the information item $d_0$, respectively $d_1$, specified the first obtaining mode M1, in a step 34', the synthesis data $D^*_0$, respectively $D^*_1$, associated with the decoded texture image $T^*_0$, respectively $T^*_1$, is decoded from the data stream BS.

If the information item $d_0$, respectively $d_1$, specifies the second obtaining mode M2, in a step 33', the synthesis data $D^+_0$, respectively $D^+_1$, associated with the decoded texture image $T^*_0$, respectively $T^*_1$, is estimated from the reconstructed texture images of the multi-view video. For this purpose, the estimation can use the decoded texture $T^*_0$, respectively $T^*_1$, and possibly other previously reconstructed texture images.

In a step 35', the decoded textures $T^*_0$ and $T^*_1$ and the decoded $(D^*_0, D^*_1)$ or estimated $(D^+_0, D^+_1)$ synthesis information are used to synthesise an image of an intermediate view S0.5.

The method for processing multi-view video data described here according to particular embodiments of the invention can notably be applied in the case where the synthesis data corresponds to depth information. However, the data processing method is applicable to any type of synthesis data, such as an object segmentation map.

It is possible for a given view at a given time of the video to apply the method described above to several types of synthesis data. For example, if the synthesis module is assisted by a depth map and an object segmentation map, these two types of synthesis data can be partially transmitted to the decoder, the other part being derived by the decoder or the synthesis module.

It should also be noted that one part of the texture can be estimated, for example by interpolation. The view corresponding to such a texture estimated at the decoder is considered in this case as a synthesis data item.

The examples described here include two texture views, respectively producing two depth maps, but other combinations are of course possible, including processing a depth map at a given time, associated with one or more texture views.

Figure 4A:
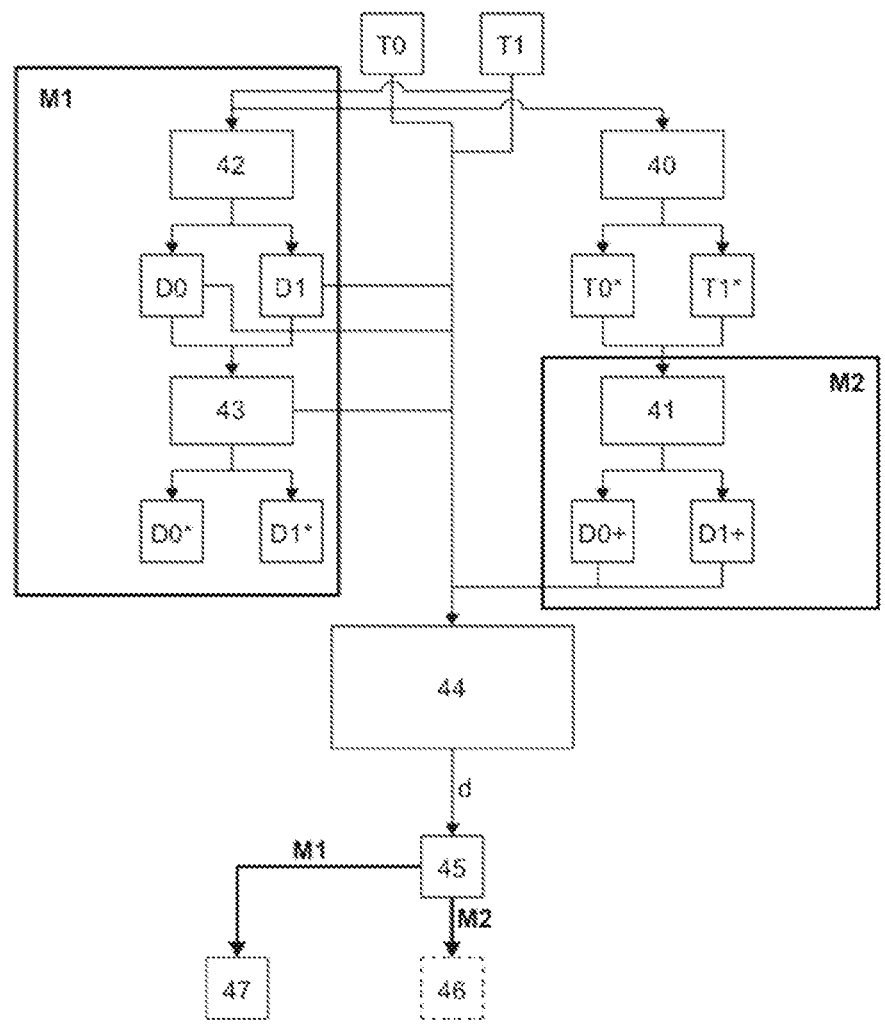
FIG. 4A illustrates steps of a multi-view video encoding method according to a particular embodiment of the invention.

FIG. 4A illustrates steps of a multi-view video encoding method according to a particular embodiment of the invention. The encoding method is described here in the case of two views comprising respectively the textures $T_0$ and $T_1$.

In a step 40, each texture $T_0$ and $T_1$ is encoded and decoded to provide the decoded textures $T^*_0$ and $T^*_1$. It should be noted that the textures can correspond here to an image of a view, or a block of an image of a view or any other type of granularity related to texture information of a multi-view video.

In a step 41, synthesis data, for example depth maps $D^+_0$ and $D^+_1$, are estimated from the decoded textures $T^*_0$ and $T^*_1$, using a depth estimator. This is the second method M2 for obtaining the synthesis data.

In a step 42, the synthesis data $D_0$ and $D_1$ is estimated from the uncoded textures $T_0$ and $T_1$, for example using a depth estimator. In a step 43, the obtained synthesis data $D_0$ and $D_1$ are then encoded and decoded to provide reconstructed synthesis data $D^*_0$ and $D^*_1$. This is the first mode M1 for obtaining the synthesis data.

In a step 44, an obtaining mode to be used at the decoder to obtain the synthesis data is determined from among the first obtaining mode M1 and the second obtaining mode M2.

According to a particular embodiment of the invention, a syntax element is encoded in the data stream to specify the selected obtaining mode. According to this particular embodiment of the invention, various variants are possible depending on how the rate and the distortion are evaluated according to the criterion to be minimised $J=D+\lambda R$, where R corresponds to the rate, D corresponds to the distortion and $\lambda$ is the Lagrangian used for the optimisation.

A first variant is based on the synthesis of an intermediate view or a block of an intermediate view, in the case where the obtaining mode is encoded for each block, and to evaluate the quality of the synthesised view, considering the two modes for obtaining the synthesis data. A first version of the intermediate view is thus synthesised for the obtaining mode M2 from the decoded textures $T^*_0$ and $T^*_1$ and the synthesis data $D^+_0$ and $D^+_1$ estimated from the decoded textures $T^*_0$ and $T^*_1$. The rate then corresponds to the encoding cost of the $T^*_0$ and $T^*_1$ textures and to the encoding cost of the syntax element specifying the selected obtaining mode. This rate can be calculated precisely using, for example, an entropic encoder (for example, an arithmetic binary encoding, a variable-length encoding, with or without context adaptation). A second version of the intermediate view is also synthesised for the obtaining mode M1 from the decoded textures $T^*_0$ and $T^*_1$ and the decoded synthesis data $D^*_0$ and $D^*_1$. The rate then corresponds to the encoding cost of the textures $T^*_0$ and $T^*_1$ and the synthesis data $D^*_0$ and $D^*_1$ to which the encoding cost of the syntax element specifying the selected obtaining mode is added. This rate can be calculated as specified above.

In both cases, the distortion can be calculated by a metric comparing the image or block of the synthesised view with the uncoded image or block of the synthesised view from the uncoded textures $T_0$ and $T_1$ and the uncoded synthesis data $D_0$ and $D_1$.

The obtaining mode providing the lowest rate/distortion cost J is selected.

According to another variant, it is possible to determine the distortion by applying a metric without reference on the synthesised image or block to avoid using the original uncompressed texture. Such a metric without reference can for example measure the amount of noise, blur, block effect, sharpness of edges, etc. in the synthesised image or block.

According to another variant, the obtaining mode is selected for example by comparing the synthesis data $D_0$ and $D_1$ estimated from the uncompressed textures and the synthesis data $D^+_0$ and $D^+_1$ estimated from the encoded-decoded textures. If the synthesis data is close enough, according to a defined criterion, estimating the synthesis data on the client side will be more efficient than encoding and transmitting the synthesis data. According to this variant, the synthesis of an image or a block of an intermediate view is avoided.

Other variants are also possible to determine a mode for obtaining the synthesis data, when it corresponds to depth maps. The selection of an obtaining mode can for example depend on the characteristics of the depth information item. For example, a computer-generated depth information item or a high-quality captured depth is more likely to be suitable for the obtaining mode M1. According to this variant, the depth maps can also be estimated from the decoded textures as described above and placed in competition with the computer-generated or high-quality captured depth maps. The computer-generated or high-quality captured depth maps then replace the depth maps estimated from the uncompressed textures in the method described above.

According to another variant, the depth quality can be used to determine a mode for obtaining the synthesis data. The depth quality, that can be measured by an appropriate objective metric, may include relevant information. For example, when the depth quality is low, or when the temporal coherence of the depth is low, it is likely that the obtaining mode M2 is the most suitable for obtaining the depth information.

Once the mode for obtaining the synthesis data is selected at the end of step 44, in a step 45, a syntax element d representative of the selected obtaining mode is encoded in the data stream. When the selected and encoded mode corresponds to the first obtaining mode M1, the synthesis data $D_0$ and $D_1$ is also encoded in the data flow, for considered block or image.

According to a particular embodiment of the invention, when the selected and encoded mode corresponds to the second obtaining mode M2, in a step 46, additional information can also be encoded in the data stream. For example, such information can correspond to one or more control parameters to be applied to the decoder or by a synthesis module when obtaining said synthesis data item according to the second obtaining mode. These parameters can be used to control a synthesis data or depth estimator, for example.

For example, the control parameters can control the features of a depth estimator, such as increasing or decreasing the search interval, or increasing or decreasing the precision.

The control parameters can specify how a synthesis data item should be estimated on the decoder side. For example, the control parameters specify which depth estimator to use. For example, in step 41 for estimating the depth maps, the encoder can test several depth estimators and select the estimator providing the best rate/distortion compromise from among: a pixel-based depth estimator, a triangle-warping based depth estimator, a fast depth estimator, a monocular neural network depth estimator, a neural network depth estimator using multiple references. According to this variant, the encoder notifies the decoder or the synthesis module to use a similar synthesis data estimator.

According to another variant or in addition to the previous variant, the control parameters can include parameters of a depth estimator such as the disparity interval, the precision, the neural network model, the optimisation or aggregation method, the smoothing factors of the energy functions, the cost functions (colour-based, correlation-based, frequency-based), a simple depth map that can be used as initialisation for the client-side depth estimator, etc.

Figure 4B:
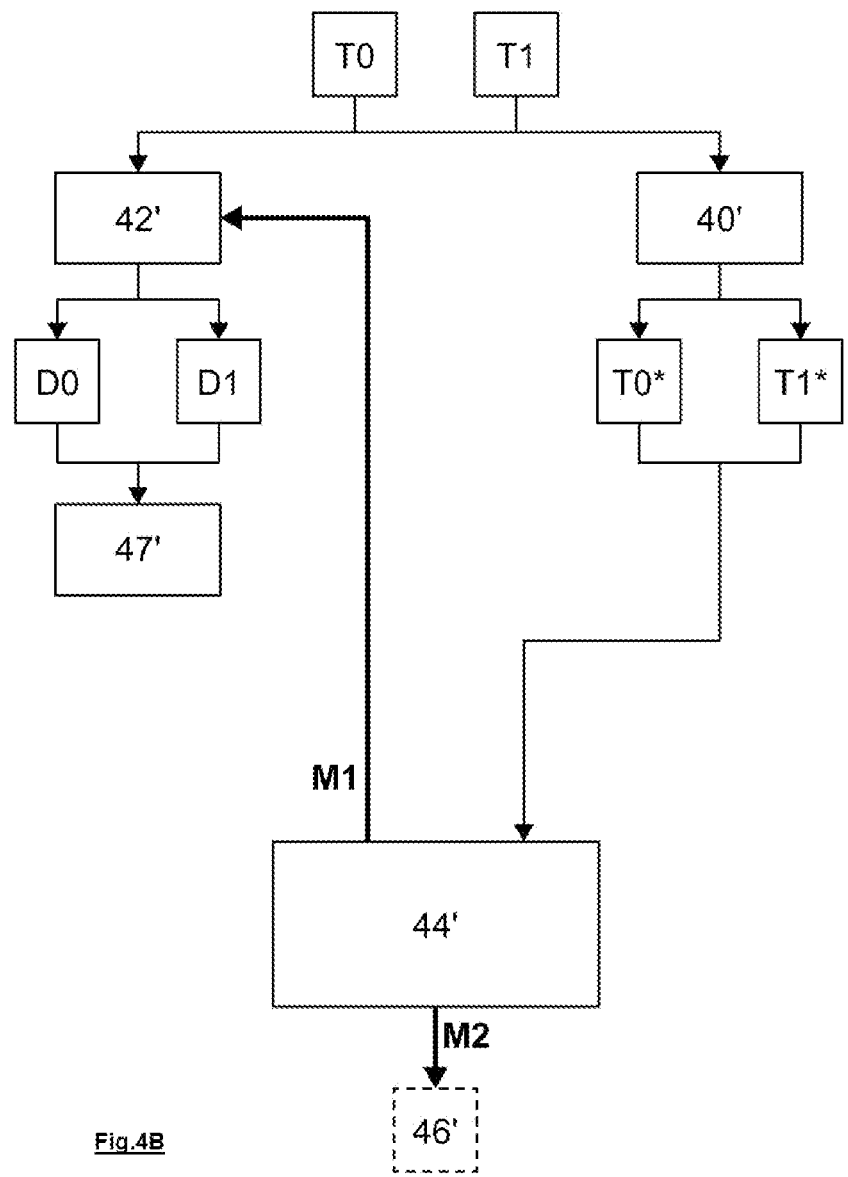
FIG. 4B illustrates steps of a multi-view video encoding method according to particular embodiments of the invention.

FIG. 4B illustrates steps of a multi-view video encoding method according to another particular embodiment of the invention. According to the particular embodiment described here, the mode for obtaining the synthesis data is not encoded in the data stream, but deduced from the encoded information that will be available to the decoder.

The encoding method is described here in the case of two views comprising respectively the textures $T_0$ and $T_1$.

In a step 40', each texture $T_0$ and $T_1$ is encoded and decoded to provide the decoded textures $T^*_0$ and $T^*_1$. It should be noted that the textures can correspond here to an image of a view, or a block of an image of a view or any other type of granularity related to texture information of a multi-view video.

In a step 44', an obtaining mode to be used at the decoder to obtain the synthesis data is determined from among the first obtaining mode M1 and the second obtaining mode M2.

According to the particular embodiment described here, the encoder can use any information item that will be available to the decoder, to decide on the obtaining mode to be applied to the considered block or image.

According to a variant, the obtaining mode can be selected based on a quantization parameter, for example, a QP used to encode an image or a texture block. For example, when the quantization parameter is greater than a given threshold, the second obtaining mode is selected, otherwise the first obtaining mode is selected.

According to another variant, when the synthesis data corresponds to depth information, the synthesis data $D_0$ and $D_1$ can be generated by computer or captured in high quality. This type of synthesis data is more suitable for the obtaining mode M1. Thus, when this is the case, the selected mode for obtaining the synthesis data will then be the obtaining mode M1. According to this variant, a metadata item must be transmitted to the decoder to specify the origin of the depth (computer-generated, captured in high quality). This information item can be transmitted at the view sequence level.

At the end of step 44', if the first obtaining mode M1 is selected, in a step 42', the synthesis data $D_0$ and $D_1$ is estimated from the uncoded textures $T_0$ and $T_1$, for example using a depth estimator. This estimation is of course not carried out in the case where the synthesis data is from computer-generation or high-quality capture.

In a step 47', the synthesis data $D_0$ and $D_1$ obtained is then encoded in the data stream.

When the selected obtaining mode corresponds to the second obtaining mode M2, according to a particular embodiment of the invention, additional information can also be encoded in the data stream, in a step 46'. For example, such information can correspond to one or more control parameters to be applied to the decoder or by a synthesis module when obtaining said synthesis data item according to the second obtaining mode. Such control parameters are similar to those described in relation to FIG. 4A.

Figure 5:
FIG. 5 illustrates an example of a multi-view video data processing scheme according to a particular embodiment of the invention.

FIG. 5 illustrates an example of a multi-view video data processing scheme according to a particular embodiment of the invention.

According to a particular embodiment of the invention, a scene is captured by a video capture system CAPT. For example, the view capture system includes one or more cameras capturing the scene.

According to the example described here, the scene is captured by two converging cameras, located outside the scene and looking towards the scene from two distinct locations. The cameras are therefore at different distances from the scene and have different angles/orientations. Each camera provides a sequence of uncompressed images. The sequences of images comprise a sequence of texture images $T_0$ and T1 respectively.

The texture images $T_0$ and $T_1$ from the sequences of image provided by the two cameras respectively are encoded by an encoder COD, for example an MV-HEVC encoder that is a multi-view video encoder. The encoder COD provides a data stream BS that is transmitted to a decoder DEC, for example via a data network.

During encoding, the depth maps $D_0$ and $D_1$ are estimated from the uncompressed textures $T_0$ and $T_1$ and the depth maps $D^+_0$ and $D^+_1$ are estimated from the decoded textures $T^*_0$ and $T^*_1$ using a depth estimator, for example the DERS estimator. A first view $T'_0$ located at a position captured by one of the cameras is synthesised, for example here the position 0, using the depth map $D_0$, and a second view $T''_0$ located at the same position is synthesised using the depth map $D^+_0$. The quality of the two synthesised views is compared, for example by calculating the PSNR (Peak Signal to Noise Ratio) between each of the synthesised views $T'_0$, $T''_0$ and the captured view $T_0$ located at the same position. The comparison allows the selection of an obtaining mode for the depth map $D_0$ from among a first acquisition mode according to which the depth map $D_0$ is encoded and transmitted to the decoder and a second acquisition mode according to which the depth map $D^+_0$ is estimated at the decoder. The same method is iterated for the depth map $D_1$ associated with the captured texture $T_1$.

Figure 7A:
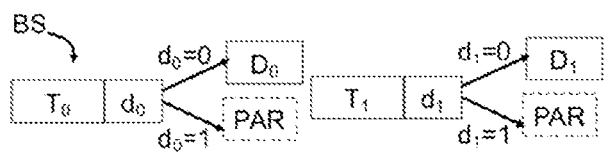
FIG. 7A illustrates an example of a data stream according to a particular embodiment of the invention.

FIG. 7A illustrates an example of one part of a data stream BS according to this particular embodiment of the invention. The data stream BS comprises the encoded textures $T_0$ and $T_1$ and the syntax elements $d_0$ and $d_1$ specifying respectively for each of the textures $T_0$ and $T_1$ the mode for obtaining the depth maps $D_0$ and $D_1$.

If it is decided to encode and transmit the depth map $D_0$, respectively $D_1$, the value of the syntax element $d_0$, respectively $d_1$ is for example 0, then the data stream BS comprises the encoded depth map $D_0$, respectively $D_1$.

If it is decided not to encode the depth map $D_0$, respectively $D_1$, the value of the syntax element $d_0$, respectively $d_1$ is for example 1, then the data stream BS does not comprise the depth map $D_0$ respectively $D_1$. It can possibly comprise, according to the embodiment variants, one or more control parameters PAR to be applied when obtaining the depth map $D^+_0$, respectively $D^+_1$, by the decoder or by the synthesis module.

The encoded data stream BS is then decoded by the decoder DEC. For example, the decoder DEC is included in a smartphone equipped with free navigation decoding features. According to this example, a user looks at the scene from the viewpoint provided by the first camera. Then, the user slowly slides their viewpoint to the left to the other camera. During this process, the smartphone displays intermediate views of the scene that have not been captured by the cameras.

For this purpose, the data stream BS is scanned and decoded by an MV-HEVC decoder for example, to provide two decoded textures $T^*_0$ and $T^*_1$. The syntax element $d_k$, with k=0 or 1, associated with each texture is decoded. If the value of the syntax element $d_k$ is 0, then the decoder decodes the depth map $D^*_k$ from the data stream BS.

If the value of the syntax element $d_k$ is 1, the depth map $D^+_k$ is estimated at the decoder or by a synthesis module from the decoded textures $T^*_0$ and $T^*_1$.

A synthesis module SYNTH, for example based on a VVS (Versatile View Synthesizer) synthesis algorithm, synthesises intermediate views with the decoded textures $T^*_0$ and $T^*_1$ and the decoded $D^*_0$ and $D^*_1$ or estimated $D^+_0$ and $D^+_1$ depth maps as appropriate to synthesise intermediate views comprised between the views corresponding to the textures $T_0$ and $T_1$.

The multi-view video data processing scheme described in FIG. 5 is not limited to the embodiment described above.

Figure 6A:
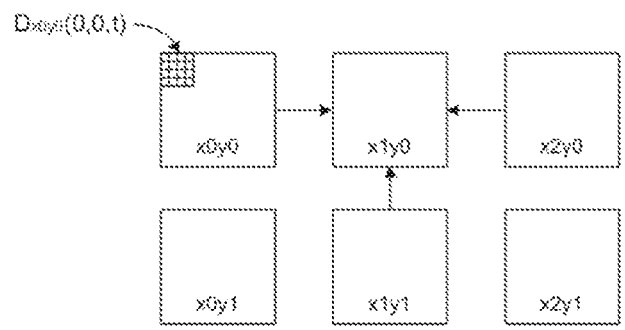
FIG. 6A illustrates a texture matrix of a multi-view video according to a particular embodiment of the invention.

According to another particular embodiment of the invention, the scene is captured by six omnidirectional cameras located in the scene, from six different locations. Each camera provides a sequence of 2D images in an equirectangular projection format (ERP). The six textures from the cameras are encoded using a 3D-HEVC encoder that is a multi-view encoder, providing a data stream BS that is for example transmitted via a data network. When encoding the multi-view sequence, a 2×3 matrix of source textures T (textures from the cameras) is provided as input to the encoder. FIG. 6A illustrates such a texture matrix comprising the textures $T_{xiyj}$ with i=0, 1 or 2 and j=0, 1 or 2.

According to the embodiment described here, a source depth map matrix D is estimated from the uncompressed textures using a depth estimator based on a neural network. The texture matrix T is encoded and decoded using the 3D-HEVC encoder providing the decoded texture matrix $T^*$. The decoded texture matrix $T^*$ is used to estimate the depth map matrix $D^+$ using the depth estimator based on the neural network.

According to the particular embodiment of the invention described here, an obtaining mode for the depth map associated with a texture is selected for each encoding block or unit (also known as CTU for Coding Tree Unit in the HEVC encoder).

Figure 6B:
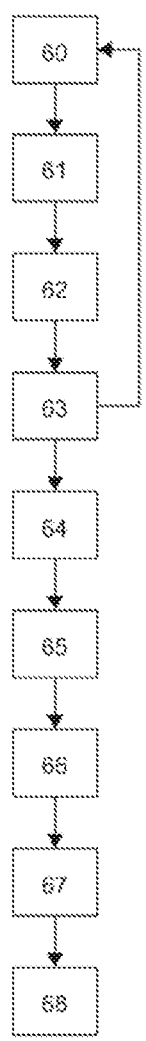
FIG. 6B illustrates steps of the depth encoding method for a current block according to a particular embodiment of the invention.

FIG. 6B illustrates the steps of the depth encoding method for a current block $D_{x0y0}(x,y,t)$ to be coded, where x,y corresponds to the position of the upper left corner of the block in the image and t to the time instant of the image.

The first block of the first depth map to be coded at time t=0 of the video sequence, identified by $D_{x0y0}(0,0,0)$ thereafter, is considered. When encoding this first block $D_{x0y0}(0,0,0)$, the depth for all other blocks that have not yet been processed is assumed to originate from the estimated source depth D. The other blocks that have not yet been processed belong to both the current view x0y0 and the other neighbouring views.

The depth encoding for the current block $D_{x0y0}(0,0,0)$ is first evaluated by determining an optimal encoding mode from among various block depth encoding tools available to the encoder. Such encoding tools can include any type of depth encoding tools available in a multi-view encoder.

In a step 60, the depth $D_{x0y0}(0,0,0)$ of the current block is encoded using a first encoding tool providing an encoded-decoded depth $D^*_{x0y0}(0,0,0)$ for the current block.

In a step 61, a view at a position of one of the cameras is synthesised using the VVS synthesis software for example. For example, a view at position x1y0 is synthesised using the views decoded at positions x0y0, x2y0 and x1y1 of the texture matrix $T^*$. During the synthesis of the view, the depth for all blocks of the multi-view video that have not yet been processed originates from the estimated source depth D. The depth for all blocks of the multi-view video for which the depth has already been encoded originates from the depth that was encoded-decoded or estimated from the decoded textures according to the obtaining mode selected for each block. The depth of the current block used for the synthesis of the view at position x1y0 is the encoded-decoded depth $D^*_{x0y0}(0,0,0)$ according to the encoding tool being evaluated. In step 62, the quality of the synthesised view is evaluated using an error metric, such as a squared error, between the synthesised view at position x1y0 and the source view $T_{x1y0}$, and the encoding cost of the current block depth according to the tested tool is calculated.

In a step 63, it is checked whether all depth encoding tools have been tested for the current block, and if not, steps 60 to 62 are iterated for the next encoding tool, otherwise the method proceeds to step 64.

In step 64, the depth encoding tool providing the best rate/distortion compromise is selected, for example the one that minimises the rate/distortion criterion J=D+λR.

In a step 65, another view at the same position as in step 61 is synthesised using the decoded textures at positions x0y0, x2y0 and x1y1 with the VVS software and the estimated depth of the current block $D^+_{x0y0}(0,0,0)$.

In a step 66, the distortion between the synthesised view at position x1y0 and the source view $T_{x1y0}$ is calculated and the depth encoding cost is set to 0, since according to this obtaining mode, the depth is not encoded but estimated at the decoder.

In a step 67, it is decided on the optimal obtaining mode according to the rate/distortion cost of each mode for obtaining the depth. In other words, the mode for obtaining the depth that minimises the rate/distortion criterion is selected from among encoding the depth with the optimal encoding tool selected in step 64 and estimating the depth at the decoder.

In a step 68, a syntax element is encoded in the data stream specifying the selected obtaining mode for the current block. If the selected obtaining mode corresponds to depth encoding, the depth is encoded in the data stream according to the optimal encoding tool selected previously. Steps 60 to 68 are iterated considering the next block to be processed $D_{x0y0}(64,0,0)$ for example if the first block has a size 64×64. All blocks in the depth map associated with the view texture at position x0y0 are processed correspondingly taking into account the encoded-decoded or estimated depths of the blocks previously processed during the synthesis of the view.

The depth maps of the other views are also processed in a similar way.

According to this particular embodiment of the invention, the encoded data stream further comprises different information for each block. If it has been decided to encode and transmit the depth for a given block, the data stream includes for this block the encoded texture of the block, a block of encoded depth data and the syntax element specifying the mode for obtaining the depth for the block.

If it was decided not to encode the depth for the block, the data stream includes for the block the encoded texture of the block, a block of depth information including the same grey level value, and the syntax element specifying the mode for obtaining the depth for the block.

It should be noted that in some cases, the data stream can comprise the consecutively encoded textures for all blocks, then the depth data and the syntax elements of the blocks.

The decoding can for example be carried out via a virtual reality headset equipped with free navigation features and worn by a user. The viewer looks at the scene from the viewpoint provided by one of the six cameras. The user looks around and slowly starts to move around the scene. The headset follows the user's movement and displays corresponding views of the scene that have not been captured by the cameras.

For this purpose, the decoder DEC decodes the texture matrix T* from the encoded data stream. The syntax elements for each block are also decoded from the encoded data stream. The depth of each block is obtained by decoding the block of depth data encoded for the block or by estimating the depth data from the decoded textures according to the value of the syntax element decoded for the block.

An intermediate view is synthesised using the decoded texture matrix T* and the reconstructed depth matrix comprising for each block the depth data obtained according to the obtaining mode specified by the syntax element decoded for the block.

According to another particular embodiment of the invention, the multi-view video data processing scheme described in FIG. 5 also applies in the case where the syntax element is not encoded at the block level or at the image level.

For example, the encoder COD can apply a decision mechanism at the image level to decide whether the depth should be transmitted to the decoder or estimated after decoding.

For this purpose, the encoder, that operates in variable rate mode, allocates quantization parameters (QPs) to the blocks of texture images in a known manner so as to achieve a target overall rate.

An average of the QPs allocated to each block of a texture image is calculated, possibly using a weighting between blocks. This provides an average PQ for the texture image, representative of a level of importance of the image.

If the average PQ obtained is above a certain threshold, it means that the target rate is a low rate. The encoder then decides to calculate the depth map for this texture image from the uncompressed textures of the multi-view video, encode the calculated depth map, and transmit it in the data stream.

If the average PQ is below or equal to the determined threshold, the target rate is a high rate. The encoder does not calculate the depth for this texture image and proceeds to the next texture image. No depth is encoded for this image, nor is any indicator transmitted to the decoder.

Figure 7B:
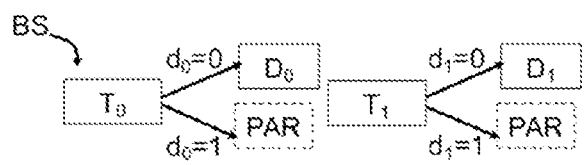
FIG. 7B illustrates an example of a data stream according to another particular embodiment of the invention.

FIG. 7B illustrates an example of one part of an encoded data stream according to this particular embodiment of the invention.

The encoded data stream notably comprises the encoded textures for each image, here $T_0$ and $T_1$. The encoded data stream also comprises information to obtain the average PQ of each image. For example, this can be encoded at the image level, or obtained conventionally from the QPs encoded for each block in the data stream.

For each texture image $T_0$ and $T_1$, the encoded data stream also comprises the calculated and encoded depth data $D_0$ and/or $D_1$ according to the decision made at the encoder. Is it noticed here that the syntax elements $d_0$ and $d_1$ are not encoded in the data stream. When it has been decided to estimate the depth for a texture image at the decoder, the data stream can comprise parameters PAR to be applied when estimating the depth. These parameters have already been described above.

The decoder DEC scans the encoded data stream and decodes the texture images $T^*_0$ and $T^*_1$. The decoder applies the same decision mechanism as the encoder, calculating the average PQ of each texture image. The decoder then deduces, using the determined threshold, that can be transmitted in the data stream or known to the decoder, whether the depth for a given texture image should be decoded or estimated.

The decoder then operates in a manner similar to that described in relation to the first embodiment of FIG. 5.

Figure 8:
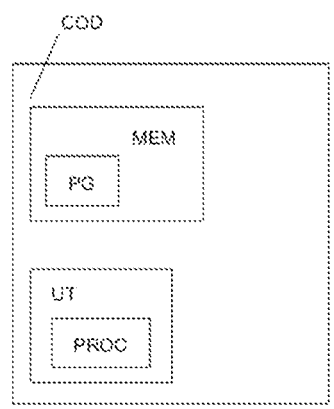
FIG. 8 illustrates a multi-view video encoding device according to a particular embodiment of the invention.

FIG. 8 shows the simplified structure of an encoding device COD adapted to implement the encoding method according to any one of the particular embodiments of the invention previously described, in particular in relation to FIGS. 2, 4A and 4B. The encoder COD can for example correspond to the encoder COD described in relation to FIG. 5.

According to a particular embodiment of the invention, the steps of the encoding method are implemented by computer program instructions. For this purpose, the encoding device COD has the standard architecture of a computer and notably comprises a memory MEM, a processing unit UT, equipped for example with a processor PROC, and driven by the computer program PG stored in the memory MEM. The computer program PG comprises instructions for implementing the steps of the encoding method as described above, when the program is executed by the processor PROC.

At initialisation, the code instructions of the computer program PG are for example loaded into a memory before being executed by the processor PROC. In particular, the processor PROC of the processing unit UT implements the steps of the encoding method described above, according to the instructions of the computer program PG.

Figure 9:
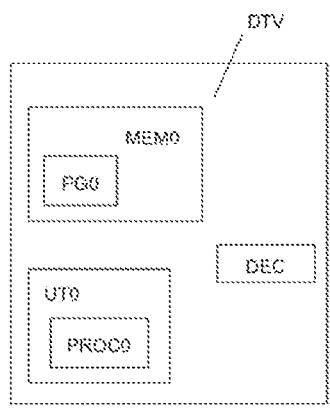
FIG. 9 illustrates a device for processing multi-view video data according to a particular embodiment of the invention.

FIG. 9 shows the simplified structure of a device for processing multi-view video data DTV adapted to implement the method for processing multi-view data according to any one of the particular embodiments of the invention previously described, in particular in relation to FIGS. 2, 3A and 3B. The device for processing multi-view video data DTV can for example correspond to the synthesis module SYNTH described in relation to FIG. 5 or to a device comprising the synthesis module SYNTH and the decoder DEC of FIG. 5.

According to a particular embodiment of the invention, the device for processing multi-view video data DTV has the standard architecture of a computer and notably comprises a memory MEM0, a processing unit UT0, equipped for example with a processor PROC0, and driven by the computer program PG0 stored in the memory MEM0. The computer program PG0 comprises instructions for implementing the steps of the method for processing multi-view video data as described above, when the program is executed by the processor PROC0.

At initialisation, the code instructions of the computer program PG0 are for example loaded into a memory before being executed by the processor PROC0. In particular, the processor PROC0 of the processing unit UT0 implements the steps of the method for processing multi-view video data described above, according to the instructions of the computer program PG0.

According to a particular embodiment of the invention, the device for processing multi-view video data DTV comprises a decoder DEC adapted to decode one or more encoded data streams representative of a multi-view video.

The invention claimed is:

1. A method for processing multi-view video data, the method comprising:
    obtaining, according to a granularity related to texture information of the multi-view video, for at least one block of an image of a view encoded in an encoded data stream representative of the multi-view video, at least one information item specifying a mode for obtaining at least one synthesis data item, from among a first obtaining mode and a second obtaining mode,
    said at least one synthesis data item being used to synthesize at least one image of an intermediate view of the multi-view video, said intermediate view not being encoded in said encoded data stream,
    said first obtaining mode corresponding to decoding the at least one information item representative of the at least one synthesis data item from the encoded data stream,
    said second obtaining mode corresponding to obtaining the at least one synthesis data item from at least said reconstructed encoded image,
    obtaining the at least one synthesis data item according to the obtaining mode specified by said at least one information item, and
    synthesizing at least one part of an image of said intermediate view from at least said reconstructed encoded image and said at least one synthesis data item obtained,
    wherein said granularity defines partitions greater than or equal to a block of the at least one block.

2. The method for processing multi-view video data according to claim 1, wherein said at least one synthesis data item corresponds to at least one part of a depth map.

3. The method for processing multi-view video data according to claim 1, wherein said at least one information item specifying the mode for obtaining the synthesis data item is obtained by decoding a syntax element.

4. The method for processing multi-view video data according to claim 3, wherein said syntax element is decoded at a block level, at an image level, at a view level, or at a multi-view level, depending on said granularity.

5. The method for processing multi-view video data according to claim 3, comprising decoding said syntax element at a block level, with a syntax element per block of said image of the view encoded in the encoded data stream, at least two syntax elements encoded in the encoded data stream having different values.

6. The method for processing multi-view video data according to claim 1, wherein said at least one information item specifying the mode for obtaining the synthesis data item is obtained from at least one data item encoded for the reconstructed encoded image.

7. The method for processing multi-view video data according to claim 6, wherein the obtaining mode is selected from among the first obtain mode and the second obtain mode based on a value of a quantization parameter used to encode at least said block.

8. The method for processing multi-view video data according to claim 1, further comprising, in response to said at least one information item specifying that the synthesis data item is obtained according to the second obtaining mode:
    decoding at least one control parameter from the encoded data stream,
    applying said control parameter when obtaining said synthesis data item according to the second obtaining mode.

9. The method for processing multi-view video data according to claim 1 wherein said granularity related to texture information comprises: a block of the image of the view, the image of the view, the view or the multi-view video.

10. A device for processing multi-view video data, comprising a processor configured to:
    obtain, according to a granularity related to texture information of the multi-view video, for at least one block of an image of a view encoded in an encoded data stream representative of the multi-view video, at least one information item specifying a mode for obtaining at least one synthesis data item, from among a first obtaining mode and a second obtaining mode,
    said at least one synthesis data item being used to synthesize at least one image of an intermediate view of the multi-view video, said intermediate view not being encoded in said encoded data stream,
    said first obtaining mode corresponding to decoding the at least one information item representative of the at least one synthesis data item from the encoded data stream,
    said second obtaining mode corresponding to obtaining the at least one synthesis data item from at least said reconstructed encoded image,
    obtain the at least one synthesis data item according to the obtaining mode specified by said at least one information item, and
    synthesize at least one part of an image of said intermediate view from at least said reconstructed encoded image and said at least one synthesis data item obtained,
    wherein said granularity defines partitions greater than or equal to a block of the at least one block.

11. A terminal comprising a device according to claim 10.

12. A method for encoding multi-view video data, the method comprising:
    determining, according to a granularity related to texture information of the multi-view video, for at least one block of an image of a view in an encoded data stream representative of the multi-view video, at least one information item specifying a mode for obtaining at least one synthesis data item, from among a first obtaining mode and a second obtaining mode,
    said at least one synthesis data item being used to synthesize at least one image of an intermediate view of the multi-view video, said intermediate view not being encoded in said encoded data stream, said first obtaining mode corresponding to decoding the at least one information item representative of the at least one synthesis data item from the encoded data stream, said second obtaining mode corresponding to obtaining the at least one synthesis data item from at least said reconstructed encoded image, and encoding said image in the encoded data stream, wherein said granularity defines partitions greater than or equal to a block of the at least one block.

13. The method for encoding multi-view video data according to claim 12, comprising encoding in the data stream a syntax element associated with said information item specifying a mode for obtaining the synthesis data item.

14. The method for encoding multi-view video data according to claim 12, further comprising, in response to the information item specifying that the synthesis data item is obtained according to the second obtaining mode:

encoding in the encoded data stream at least one control parameter to be applied when obtaining said synthesis data item according to the second obtaining mode.

15. A device for encoding multi-view video data, comprising a processor and a memory configured to:

determine, according to a granularity related to texture information of the multi-view video, for at least one block of an image of a view in an encoded data stream representative of the multi-view video, at least one information item specifying a mode for obtaining at least one synthesis data item, from among a first obtaining mode and a second obtaining mode, said at least one synthesis data item being used to synthesize at least one image of an intermediate view of the multi-view video, said intermediate view not being encoded in said encoded data stream, said first obtaining mode corresponding to decoding the at least one information item representative of the at least one synthesis data item from the encoded data stream, said second obtaining mode corresponding to obtaining the at least one synthesis data item from at least said reconstructed encoded image, and encode said image in the encoded data stream, wherein said granularity defines partitions greater than or equal to a block of the at least one block.

16. A non-transitory computer-readable storage medium, comprising instructions of a computer program stored thereon which when executed by a processor of a device, configure the device to implement a method of processing multi-view video data, the method comprising:

obtaining, according to a granularity related to texture information of the multi-view video, for at least one block of an image of a view encoded in an encoded data stream representative of the multi-view video, at least one information item specifying a mode for obtaining at least one synthesis data item, from among a first obtaining mode and a second obtaining mode, said at least one synthesis data item being used to synthesize at least one image of an intermediate view of the multi-view video, said intermediate view not being encoded in said encoded data stream, said first obtaining mode corresponding to decoding the at least one information item representative of the at least one synthesis data item from the encoded data stream, said second obtaining mode corresponding to obtaining the at least one synthesis data item from at least said reconstructed encoded image, obtaining the at least one synthesis data item according to the obtaining mode specified by said at least one information item, and synthesizing at least one part of an image of said intermediate view from at least said reconstructed encoded image and said at least one synthesis data item obtained, wherein said granularity defines partitions greater than or equal to a block of the at least one block.

17. A non-transitory computer-readable storage medium, comprising instructions of a computer program stored thereon which when executed by a processor of a device, configure the device to implement a method for encoding multi-view video data, the method comprising:

determining, according to a granularity related to texture information of the multi-view video, for at least one block of an image of a view in an encoded data stream representative of the multi-view video, at least one information item specifying a mode for obtaining at least one synthesis data item, from among a first obtaining mode and a second obtaining mode, said at least one synthesis data item being used to synthesize at least one image of an intermediate view of the multi-view video, said intermediate view not being encoded in said encoded data stream, said first obtaining mode corresponding to decoding the at least one information item representative of the at least one synthesis data item from the encoded data stream, said second obtaining mode corresponding to obtaining the at least one synthesis data item from at least said reconstructed encoded image, and encoding said image in the encoded data stream, wherein said granularity defines partitions greater than or equal to a block of the at least one block.

* * * * *